United States Patent
Yamamizu (10) Patent No.: US 9,158,353 B2
(45) Date of Patent: Oct. 13, 2015

(54) INFORMATION PROCESSING APPARATUS THAT OFFERS CHANCE OF ELIMINATING HANG-UP STATE BY USING A POWER SUPPLY, CONTROL METHOD THEREFOR, AND STORAGE MEDIUM

(75) Inventor: Hiroshi Yamamizu, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 391 days.

(21) Appl. No.: 13/575,674

(22) PCT Filed: May 31, 2012

(86) PCT No.: PCT/JP2012/064609
§ 371 (c)(1),
(2), (4) Date: Jul. 27, 2012

(87) PCT Pub. No.: WO2012/169560
PCT Pub. Date: Dec. 13, 2012

(65) Prior Publication Data
US 2013/0166926 A1    Jun. 27, 2013

(30) Foreign Application Priority Data
Jun. 8, 2011    (JP) .................................. 2011-128126

(51) Int. Cl.
*G06F 1/24*    (2006.01)
*G06F 1/26*    (2006.01)
(Continued)

(52) U.S. Cl.
CPC ............ *G06F 1/263* (2013.01); *G03G 15/5079* (2013.01); *G03G 15/5087* (2013.01);
(Continued)

(58) Field of Classification Search
CPC ......... G06F 1/3287; G06F 1/24; G06F 1/263; G06F 11/1441

USPC ........................................ 713/323, 2; 714/23
See application file for complete search history.

(56) References Cited

U.S. PATENT DOCUMENTS

| 7,774,633 B1 * | 8/2010 | Harrenstien et al. ......... 713/323 |
| 2010/0213771 A1 | 8/2010 | Tsuganezawa |

FOREIGN PATENT DOCUMENTS

| JP | 08-163298 A | 6/1996 |
| JP | 2010-194729 A | 9/2010 |
| JP | 2011-025562 A | 2/2011 |

OTHER PUBLICATIONS

International Search Report issued Sep. 4, 2012 for parent PCT Application No. PCT/JP2012/064609.

(Continued)

*Primary Examiner* — Albert Wang
(74) *Attorney, Agent, or Firm* — Rossi, Kimms & McDowell LLP (57) ABSTRACT

An information processing apparatus which is capable of, when hang-up occurs, eliminating the hang-up state and restoring to a normal state without bothering a user. A first power supply unit supplies power to predetermined devices among a plurality of devices, and a second power supply unit supplies power to the plurality of devices. When startup is done with power being supplied to the predetermined devices, software is started by supplying power to all of the plurality of devices. When the second power supply unit is turned on during the startup, whether or not the software has been normally started is determined. When the software has not been normally started, the software is restarted by carrying out an off-on process in which the plurality of devices are reset, the second power supply unit is turned off, and then the second power supply unit is turned on again.

12 Claims, 8 Drawing Sheets

(51) Int. Cl.
*G03G 15/00* (2006.01)
*H04N 1/00* (2006.01)
*G06F 11/14* (2006.01)
*G06F 1/32* (2006.01)

(52) U.S. Cl.
CPC ... *G03G15/80* (2013.01); *G06F 1/24* (2013.01); *G06F 11/1441* (2013.01); *H04N 1/00891* (2013.01); *H04N 1/00899* (2013.01); *H04N 1/00904* (2013.01); *G03G 2215/00109* (2013.01); *G06F 1/3203* (2013.01)

(56) References Cited

OTHER PUBLICATIONS

Chinese Office Action issued in Chinese counterpart application No. CN201280027146.4, dated Apr. 3, 2015. English translation provided.

\* cited by examiner

INFORMATION PROCESSING APPARATUS THAT OFFERS CHANCE OF ELIMINATING HANG-UP STATE BY USING A POWER SUPPLY, CONTROL METHOD THEREFOR, AND STORAGE MEDIUM

This application is a U.S. National Phase Application of PCT International Application PCT/JP2012/064609 filed on May 31, 2012 which is based on and claims priority from JP 2011-128126 filed on Jun. 8, 2011 the contents of which is incorporated herein in its entirety by reference.

TECHNICAL FIELD

The present invention relates to an information processing apparatus, a control method therefore, and a storage medium storing a program for implementing the control method, and in particular to power supply control in an information processing apparatus such as an image processing apparatus.

BACKGROUND ART

In general, in an image processing apparatus which is an exemplary information processing apparatus, when power-off is instructed by a user, control software (control program) carries out termination processing or the like for data protection or the like, and then the power is turned off. Namely, after a longer time period (delay time period) than a time period required for the termination processing has elapsed, the power is turned off.

For the purpose of power saving, when an event such as a print job does not occur for a predetermined time period, the image processing apparatus goes from a so-called standby mode to a sleep mode to reduce power consumption. However, if so-called hang-up of control software occurs when the image processing apparatus returns from the sleep mode to the standby mode, the above-mentioned termination processing cannot be carried out, and hence the image processing apparatus may stop operating.

Therefore, even though the image processing apparatus stops operating due to the occurrence of hang-up, the user has to wait for the above-mentioned delay time period until the power is turned off.

To cope with this, there have been image processing apparatuses which are equipped with first and second switches for shutting down electrical power, the first switch capable of being operated by a user, and the second switch capable of being operated based on control using software (see, for example, PTL (Patent Literature) 1). Here, the first switch shuts down electrical power supplied via a first supply line, and the second switch shuts down electrical power supplied via a second supply line. When hang-up occurs, the first switch is turned off, and when a shorter time period than the above-mentioned delay time period has elapsed, the second switch is turned off using a timer.

CITATION LIST

Patent Literature

{PTL 1} Japanese Laid-Open Patent Publication (Kokai) No. 2010-194729

SUMMARY OF INVENTION

Technical Problem

As described above, if hang-up occurs in an image processing apparatus when it returns from a sleep mode (power-saving mode), the image processing apparatus is not started, and a user cannot easily know why the image processing apparatus does not start. Thus, there may be cases where the user does not turn off the switch and has to wait for a long time with the image processing apparatus hanging up. Namely, unless the user recognizes the hang-up state and turns off the switch, the hang-up state continues, and the user has to wait for a long time.

The present invention provides an information processing apparatus and a control method therefore which are capable of, when hang-up occurs, eliminating the hang-up state and restoring to a normal state without bothering a user, as well as a storage medium storing a program for implementing the control method.

Solution to Problem

Accordingly, in a first aspect of the present invention, there is provided an information processing apparatus that has a plurality of devices and starts software by supplying power to all of the plurality of devices when the information processing apparatus is started with power being supplied to predetermined devices among the plurality of devices, comprising a first power supply unit configured to supply power to the predetermined devices, a second power supply unit configured to supply power to the plurality of devices, a determination unit configured to, when the second power supply unit is turned on during the startup, determine whether the software has been normally started, and a control unit configured to, when the determination unit determines that the software has not been normally started, restart the software by carrying out a first off-on process in which the plurality of devices are reset, the second power supply unit is turned off, and then the second power supply unit is turned on again.

Accordingly, in a second aspect of the present invention, there is provided a control method for an information processing apparatus that has a plurality of devices and also has a first power supply unit that supplies power to predetermined devices among the plurality of devices, and a second power supply unit that supplies power to the plurality of devices, and starts software by supplying power to all of the plurality of devices when the information processing apparatus is started with power being supplied to the predetermined devices, comprising a determination step of, when the second power supply unit is turned on during the startup, determining whether the software has been normally started, and a control step of, when it is determined in the determination step that the software has not been normally started, restarting the software by carrying out an off-on process in which the plurality of devices are reset, the second power supply unit is turned off, and then the second power supply unit is turned on again.

Accordingly, in a third aspect of the present invention, there is provided a non-transitory computer-readable storage medium storing a control program used in an information processing apparatus that has a plurality of devices and also has a first power supply unit that supplies power to predetermined devices among the plurality of devices, and a second power supply unit that supplies power to the plurality of devices, and starts software by supplying power to all of the plurality of devices when the information processing apparatus is started with power being supplied to the predetermined devices, comprising a determination step of, when the second power supply unit is turned on during the startup, determining whether the software has been normally started, and a control step of, when it is determined in the determination step that the software has not been normally started, restarting the software by carrying out an off-on process in which the plurality of devices are reset, the second power supply unit is turned off, and then the second power supply unit is turned on again.

Accordingly, in a fourth aspect of the present invention, there is provided an information processing apparatus that operates in a first electrical power state or a second electrical power state in which the smaller electric power is consumed than in the first electrical power state, comprising a power control unit configured to, when a condition for bringing an electrical power state of the information processing apparatus from the second electrical power state into the first electrical power state is detected, carry out a transition process of bringing the electrical power state of the information processing apparatus into the first electrical power state, a detecting unit configured to detect whether software which is started when the power control unit brings the electrical power state of the information processing apparatus into the first electrical power state is normally started, and a initializing unit configured to initialize the power control unit when the detecting unit detects that the software is not normally started, wherein the power control unit initialized by the initializing unit carries out again the transition process of bringing the electrical power state of the information processing apparatus into the first electrical power state.

Advantageous Effects of Invention

According to the present invention, because even when software hangs up during startup at the time of return from a power-saving mode, devices are initialized and restarted, a chance of eliminating the hang-up state and restoring to a normal state without bothering the user can be offered.

The features and advantages of the invention will become more apparent from the following detailed description taken in conjunction with the accompanying drawings.

DESCRIPTION OF EMBODIMENTS

A description will be given of an information processing apparatus according to an embodiment of the present invention with reference to the drawings.

Figure 1:
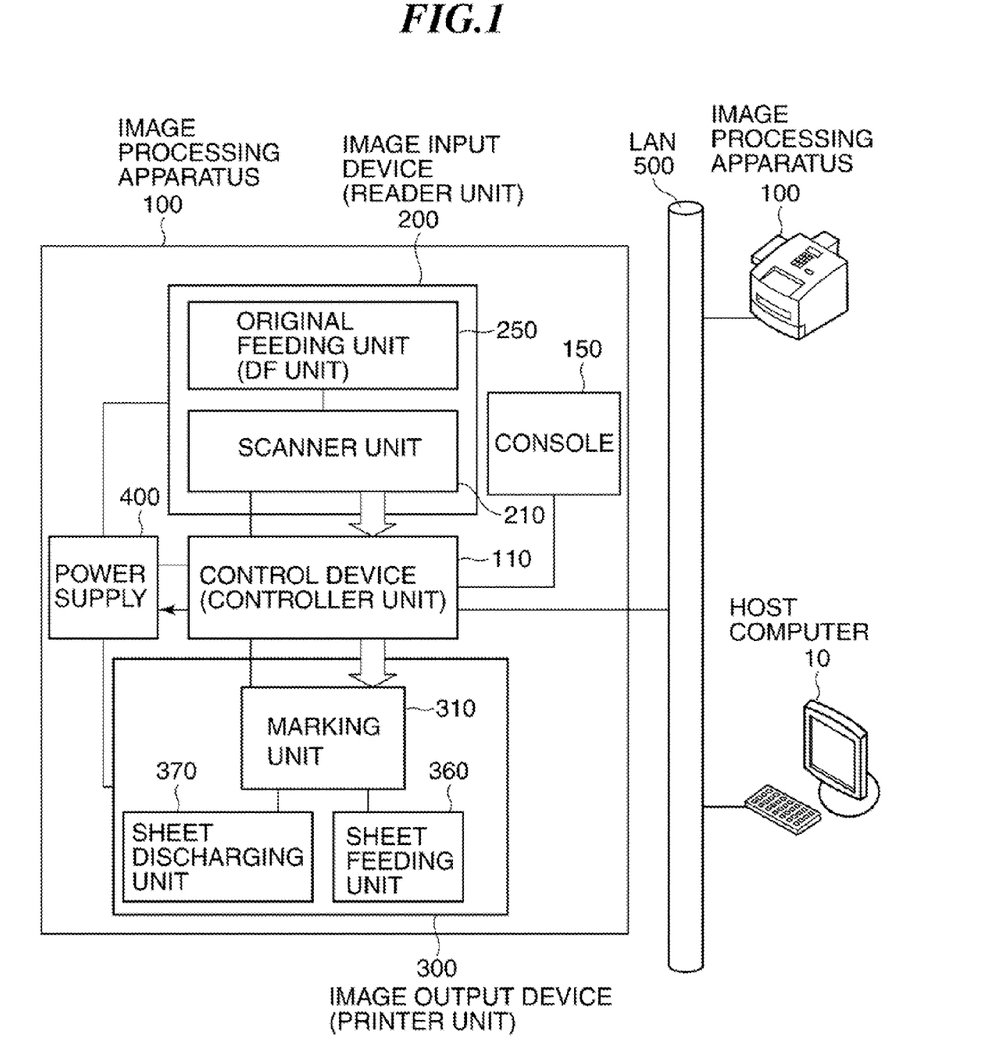
FIG. 1 is a diagram showing an exemplary network system having image processing apparatuses which are exemplary information processing apparatuses according to a first embodiment of the present invention.

FIG. 1 is a diagram showing an exemplary network system having image processing apparatuses which are exemplary information processing apparatuses according to the embodiment of the present invention.

The network system shown in the figure has a plurality of image processing apparatuses 100, each of which is connected to a LAN 500 which is a network. A host computer 10 is connected to the LAN 500. It should be noted that although in the example shown in the figure, the two image processing apparatuses 100 are shown, at least one image processing apparatus 100 has only to be provided, and there may be a plurality of host computers 10. When the host computer 10 is to perform printing using any of the image processing apparatuses 100, the host computer 10 designates the image processing apparatus 100 which should perform printing.

The image processing apparatus 100 shown in the figure has image processing functions such as a printer function, an image input function, an image filing function, an image transmitting and receiving function, and an image converting function.

An image input device (reader unit) 200 optically reads an image off an original to obtain image data. The reader unit 200 has a scanner unit 210 for reading an image off an original, and an original feeding unit 250 for conveying an original to the scanner unit 210.

An image output device (printer unit) 300 prints image data as a visible image on a recording sheet, and discharges the recording sheet from the apparatus. The printer unit 300 has a sheet feeding unit 360, a marking unit 310, and a sheet discharging unit 370. The sheet feeding unit 360 has a plurality of sheet feeding cassettes, in which, for example, recording sheets of different sizes are stored. The marking unit 310 transfers toner images corresponding to image data onto a recording sheet conveyed from the sheet feeding unit 360, and fixes the toner images on the recording sheet. The sheet discharging unit 370 carries out post processing such as sorting or stapling on a recording sheet after printing, and outputs the recording sheet from the apparatus.

A control device (controller unit) 110 shown in the figure is electrically connected to the reader unit 200 and the printer unit 300 and is also connected to the LAN 500 that is a network. The controller unit 110 carries out a copying process in which it controls the reader unit 200 to read an image off an original and controls the printer unit 300 to form an image corresponding to image data on a recording sheet.

The controller unit 110 also carries out a scanner process in which it converts image data obtained as a result of reading by the reader unit 200 into code data, and transmits the code data to the host computer 10 via the LAN 500. Further, the controller unit 110 carries out a printer process in which it converts code data received from the host computer via the LAN 500 into image data, and outputs the image data to the printer unit 300.

A console 150 is connected to the controller unit 100, and has, for example, a liquid crystal touch panel. This liquid crystal touch panel acts as a user interface.

A power supply device 400 converts alternating-current power (AC power) into direct-current power (DC power), and supplies the DC power to the controller unit 110, the reader unit 200, and the printer unit 300. The controller unit 110 controls power supply as will be described later.

Figure 2:
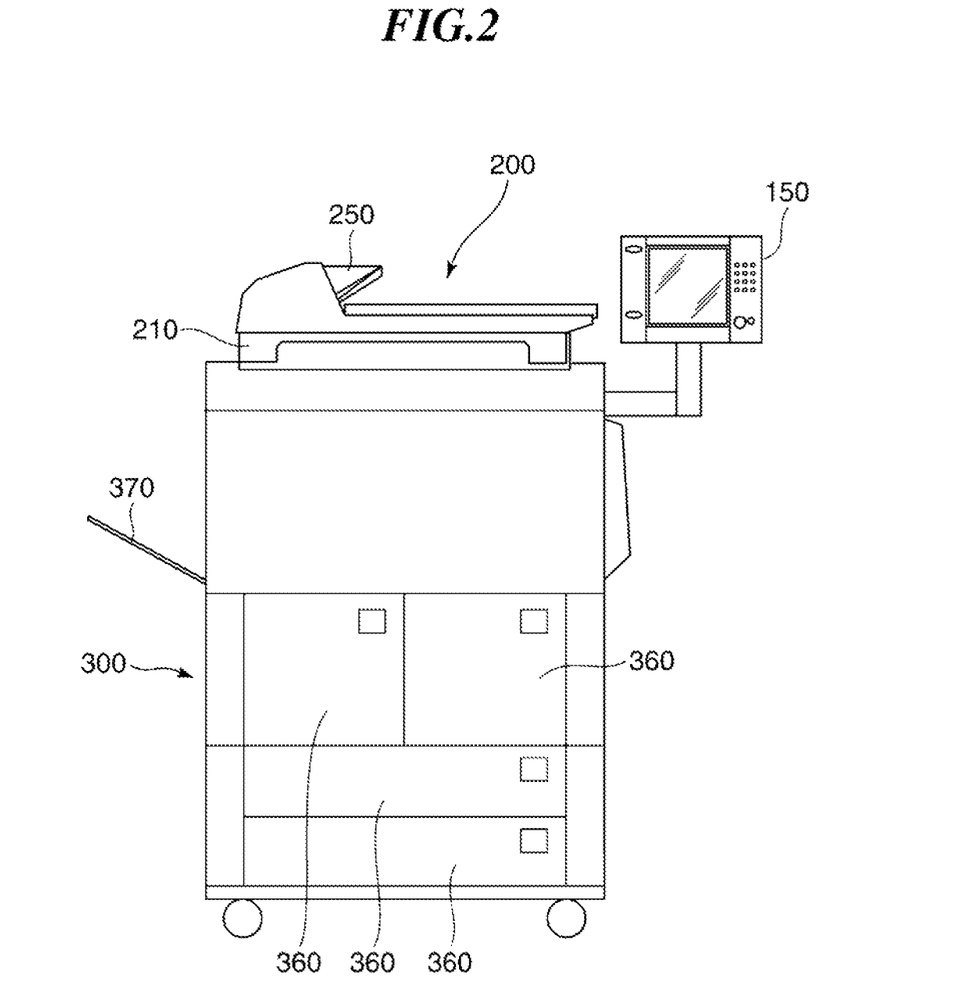
FIG. 2 is a side view showing an appearance of the image processing apparatus appearing in FIG. 1.

FIG. 2 is a side view showing an appearance of the image processing apparatus 100 appearing in FIG. 1.

As shown in the figure, the reader unit 200 is disposed on the printer unit 300, and the console 150 is disposed on a right side of the printer unit 300. A discharging tray of the discharging unit 370 that printer unit 300 has is disposed on a left side of the printer unit 300. The controller unit 110 and the power supply device 400 appearing in FIG. 1 are housed in the printer unit 300 appearing in FIG. 2.

Referring to FIGS. 1 and 2, the reader unit 200 has a plurality of CCDs (optical reading devices). When the CCDs have different sensitivities, it is determined that pixels constituting an image have different densities when the image on an original is read off. Thus, image data corresponding to reflected light obtained by the reader unit 200 scanning a white board (uniformly white board) by exposing the same to light is sent to the controller unit 110 so as to calibrate the sensitivities of the CCDs.

As described above, the reader unit 200 scans an original by exposing the same to light and inputs reflected light from the original to the CCDs. The CCDs then output electric signals (analog signals) corresponding to the amount of reflected light. The reader unit 200 converts the electric signals into luminance signals of R, G, and B colors, digitalizes them, and sends the resulting data as image data to the controller unit 110.

At the time of reading originals, the originals are placed on a tray provided in the original feeding unit 250. When a user inputs an instruction to start reading via the console 150, the controller unit 110 gives an original reading instruction to the reader unit 200. In response to the original reading instruction, the reader unit 200 feeds originals one by one from the tray in the original feeding unit 250. The originals are then fed to the scanner unit 210.

It should be noted that at the time of reading originals, the originals may be placed on a glass surface (not shown), and an exposure unit provided in the scanner unit may be moved along the glass surface to scan the originals.

As described above, upon receiving image data, the controller unit 110 controls the printer unit 300 to perform printing based on image data. The printer unit 300 has, for example, a photosensitive drum, and performs image formation (printing) by a so-called electrophotographic process.

It should be noted that as an alternative to the electrophotographic process, the printer unit 300 may use, for example, a so-called ink-jet process in which ink is jetted from a minute nozzle array to perform printing on a recording sheet.

Figure 3:
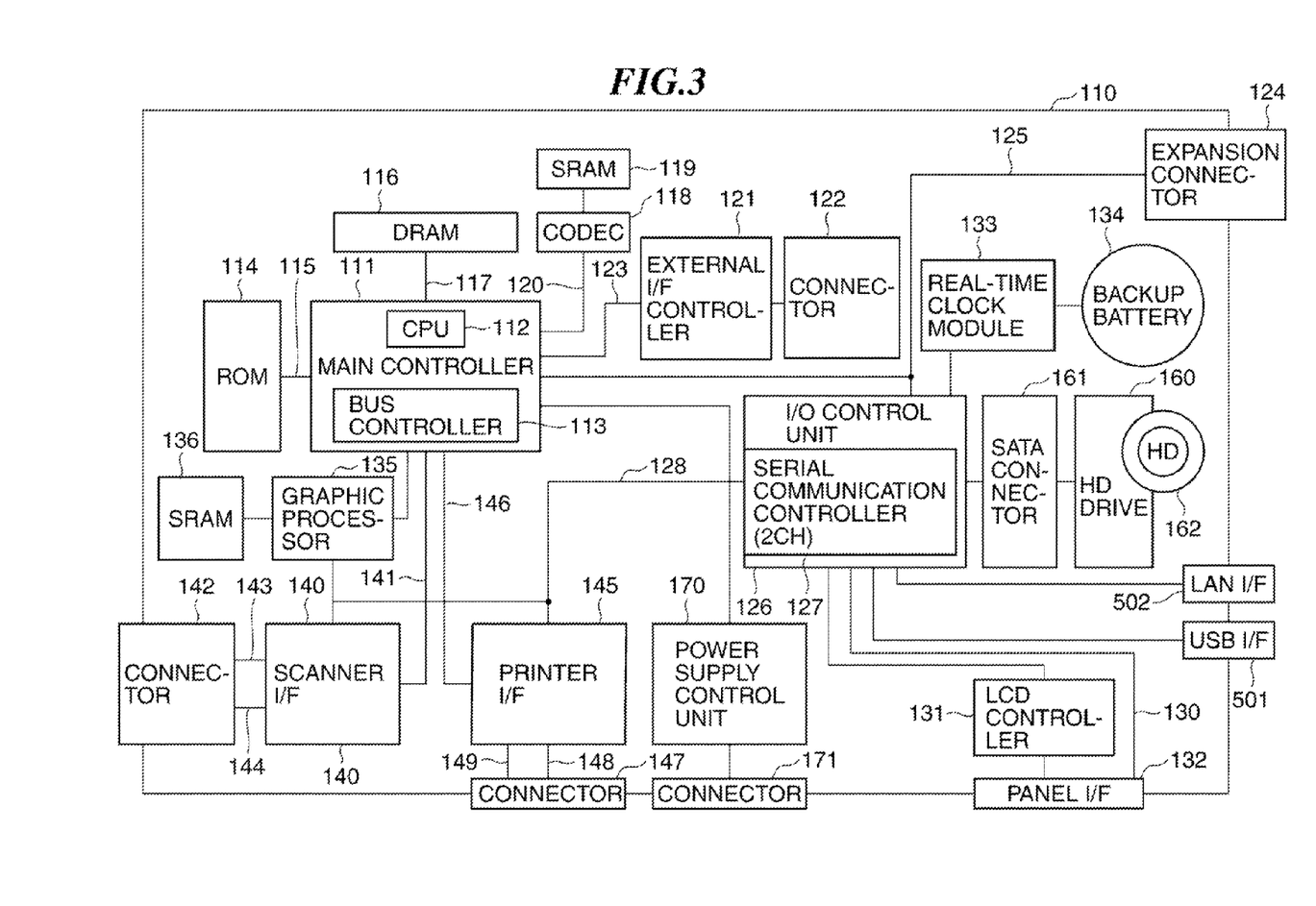
FIG. 3 is a block diagram schematically showing a hardware arrangement of a controller unit appearing in FIG. 1.

FIG. 3 is a block diagram schematically showing a hardware arrangement of the controller unit 110 appearing in FIG. 1.

Referring to FIG. 3, the controller unit 110 has a main controller 111. The main controller 111 has a CPU 112, a bus controller 113, and various I/F controller circuits (not shown).

The CPU 112 and the bus controller 113 control the overall operation of the controller unit 110. The CPU 112 operates in accordance with control programs read from a ROM 114 via a ROM I/F 115. The CPU 112 interprets PDL (page description language) code data received from the host computer 10 (FIG. 1), and expands the PDL code data into raster image data. The bus controller 113 controls transfer of data input and output from each I/F, and mediates in the event of a bus conflict and provides control in transferring DMA data.

A DRAM 116 is connected to the main controller 111 via a DRAM I/F 117. The DRAM 116 is used as a work area for the CPU 112 and as an area for accumulating image data (including raster image data).

A Codec 118 compresses raster image data, which is accumulated in the DRAM 116, using MH, MR, MMR, JBIG, JPEG, or the like. Further, the Codec 118 expands code data, which is compressed and accumulated in the DRAM 116, into raster image data. An SRAM 119 is used as a temporary work area for the Codec 118.

The Codec 118 is connected to the main controller 111 via an I/F 120, and data transfer between the Codec 118 and the DRAM 116 is controlled by the bus controller 113 and done by DMA transfer.

A graphic processor 135 carries out processes such as image rotation, zooming, and color space conversion. An external communication I/F controller 121 is connected to the main controller 111 by an I/F 123, and further connected to the LAN 500 (FIG. 1), which is a network, by a connector 122.

An expansion connector 124 for connecting an expansion board and an I/O control unit 126 are connected to a universal high-speed bus 125. For example, a PCI (Peripheral Component Interconnect) bus or a PCI Express bus is used as the universal high-speed bus 125.

The I/O control unit 126 is provided with a two-channel asynchronous serial communication controller 127 for transmitting and receiving control commands to and from CPUs provided respectively in the reader unit 200 and the printer unit 300. The serial communication controller 127 is connected to a scanner I/F circuit 140 and a printer I/F circuit 145 by an I/O bus 128.

The I/O control unit 126 is connected to a panel I/F 132 via an LCD controller 131 and also connected to the panel I/F 132 via a key input I/F 130. The LCD controller 131 produces screen displays on the liquid crystal touch panel provided in the console 150 (FIG. 1) via the panel I/F 132. The I/O control unit 126 also receives inputs from hardware keys and touch panel keys, which are provided in the console 150, via the key input I/F 130.

An input instruction (input signal) input through operation of the liquid crystal touch panel or the hardware keys is transmitted to the CPU 112 by the I/O control unit 126. On the liquid crystal touch panel, images corresponding to image data are displayed, and also, functions corresponding to various input operations are displayed.

A real-time clock module 133 updates and stores date and time managed in the image processing apparatus. The power to the real-time clock module 133 is backed up by a backup battery 134.

An external storage device is connected to a SATA (Serial Advanced Technology Attachment) connector 161. In the example shown in FIG. 3, a hard disk (HD) drive 160 which is an external storage device is connected to the SATA connector 161. Image data is stored in an HD 162 by the HD drive 160. The HD drive 160 loads image data recorded in the HD 162.

Connectors 142 and 147 are connected to the reader unit 200 and the printer unit 300, respectively. The connector 142 is connected to a scanner I/F 140 by an asynchronous serial I/F 143 and a video I/F 144, and the connector 147 is connected to a printer I/F 145 by an asynchronous serial I/F 148 and a video I/F 149.

The scanner I/F 140 is connected to the main controller 111 by a scanner bus 141. The scanner I/F 140 carries out predetermined processing on image data received from the reader unit 200. Further, the scanner I/F 140 outputs a control signal, which is generated based on a video control signal from the reader unit 200, to the scanner bus 141. It should be noted that data transfer from the scanner bus 141 to the DRAM 116 is controlled by the bus controller 113.

The printer I/F 145 is connected to the main controller 111 by a printer bus 146. The scanner I/F 145 carries out predetermined processing on image data received from the main controller 111 and outputs the resulting image data to the printer unit 300. Further, the printer I/F 145 outputs a control signal, which is generated based on a video control signal from the printer unit 300, to the printer bus 146.

At the time of transferring raster image data expanded on the DRAM 116 to the printer unit 300, the transfer is controlled by the bus controller 113. Namely, the raster image data is transferred by DMA to the printer unit 300 via the printer bus 146 and the video I/F 149.

A LAN I/F 502 is connected to the host computer 10 via the LAN 500. The LAN I/F 502 receives a printing instruction from the host computer 10.

The power supply control unit 170 is connected to the power supply 400 via a connector 171. Further, the power supply control unit 170 is connected to the main controller 111. As will be described later, the power supply control unit 170 performs control to determine whether or not to supply power under the control of the main controller 111.

Figure 4:
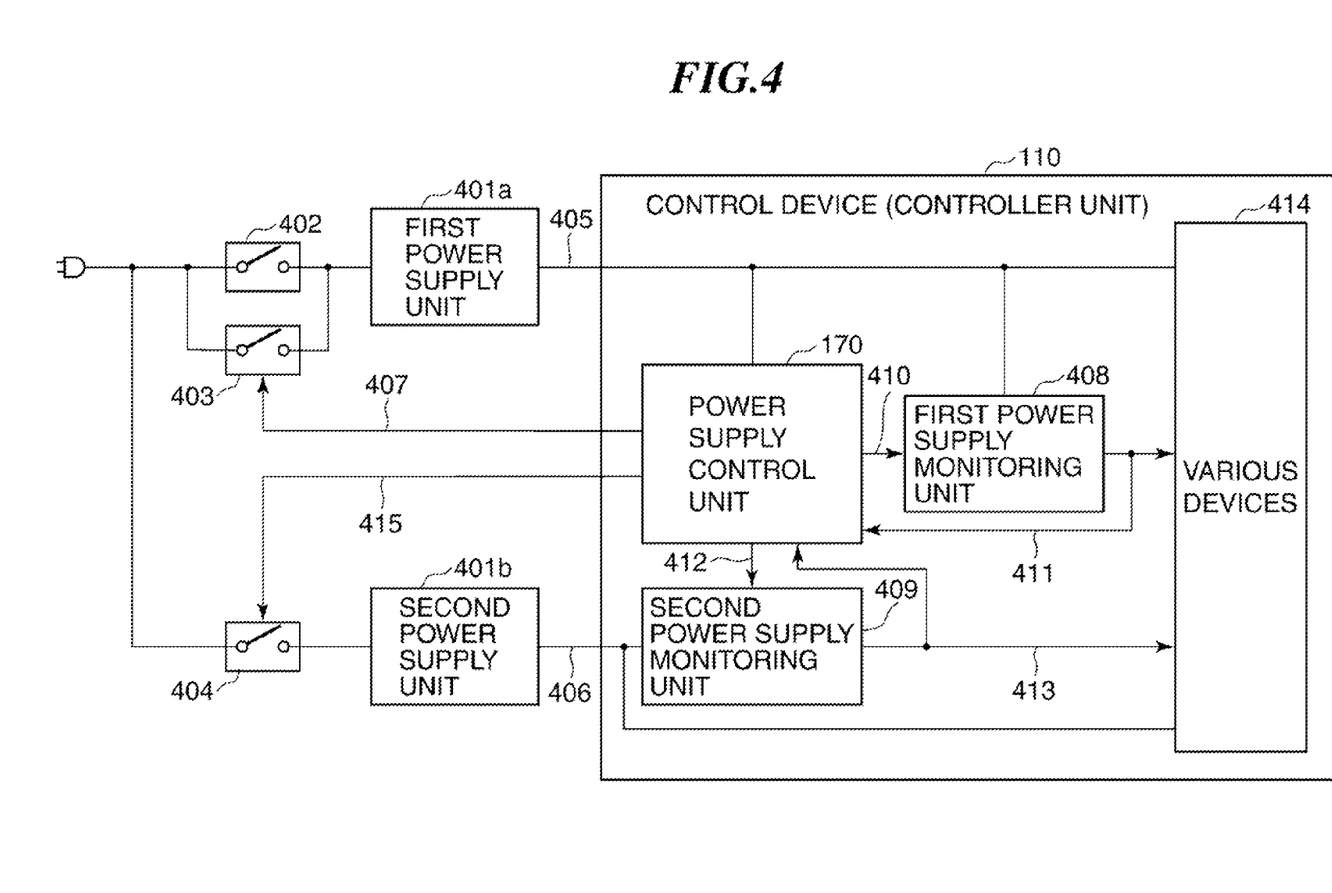
FIG. 4 is a block diagram schematically showing a hardware arrangement associated with a power supply control system in the controller unit appearing in FIG. 3.

FIG. 4 is a block diagram schematically showing a hardware arrangement associated with a power supply control system in the controller unit 110 appearing in FIG. 3. Although only the power supply control unit 170 is illustrated as the power supply control system in FIG. 3, the controller unit 110 is additionally provided with first and second power supply monitoring units 408 and 409 as shown in FIG. 4. The power supply (power supply device) 400 appearing in FIG. 1 also has first and second power supply units 401a and 401b and first to third switches 402 to 404 although they are not shown in FIG. 3. It should be noted that in FIG. 4, component elements constituting the controller unit 110 are various devices 414.

The first switch 402 is a switch for turning on or off the power to the image forming apparatus 100. When the user turns on the first switch 402, AC power is input from a plug to the first power supply unit 401a via the first switch 402.

The first power supply unit 401a converts the AC power to DC power and supplies the DC power as first power 405 to the controller unit 110. Even when the image forming apparatus 100 is in a high-speed startup mode and a sleep mode, the first power 405 is supplied to the controller unit 110. The first power 405 is supplied mainly to the power supply control unit 170 and is also supplied to a receipt detection circuit (not shown) for detecting receipt from the LAN 500 or a FAX in the sleep mode. In the high-speed startup mode, the first power 405 is used as power for holding data in memory (such as DRAM).

The second and third switches 403 and 404 are controlled to be turned on and off by the power supply control unit 170. The power supply control unit 170 provides control to turn on and off the second switch 403 by a control signal 407. When the image forming apparatus 100 is normally operating or in the high-speed startup mode or the sleep mode, the power supply control unit 170 turns on the second switch 403. As a result, the first power 405 is supplied to the controller unit 110 via the second switch 403. It should be noted that in the high-speed startup mode, the first switch 402 is off, and the second switch 403 is on, so that minimum electrical power is supplied to the controller unit 110 to start the image forming apparatus 100 at high speed.

When the third switch 404 is turned on, the second power supply unit 401b converts the AC power to DC power and supplies the DC power as second power 406 to the controller unit 110. The power supply control unit 170 provides control to turn on and off the third switch 404 by a control signal 415.

When the image forming apparatus 100 is in the high-speed startup mode or the sleep mode, the power supply control unit 170 turns off the third switch 404 to stop the input of the AC power to the second power supply unit 401b. As a result, the second power supply unit 401b stops supplying the second power 406 to the controller unit 110.

The first power supply monitoring unit 408 monitors the first power 405 and determines whether or not the voltage thereof is normal. Upon determining that the voltage of the first power 405 is not normal (for example, when the voltage of the first power 405 falls outside a predetermined voltage range), the first power supply monitoring unit 408 transmits a reset signal 411 to the power supply control unit 170 and the various devices 414. When the reset signal 411 is asserted (becomes active), the power supply control unit 170 is reset to its initial state. Specifically, information stored in the RAM in the power supply control unit 170 and register information are reset by resetting the power supply control unit 170.

As shown in the figure, the power supply control unit 170 supplies a reset signal 410 to the first power supply monitoring unit 408. When the power supply control unit 170 asserts the reset signal 410, the first power supply monitoring unit 408 asserts the reset signal 411. As a result, a reset is issued to the power supply control unit 170 and the various devices 414. It should be noted that in response to the input of the reset signal 411, the power supply control unit 170 determines whether or not the first power 405 is being normally supplied.

The second power supply monitoring unit 409 monitors the second power 406 and determines whether or not the voltage thereof is normal. Upon determining that the voltage of the second power 406 is not normal (for example, when the voltage of the second power 406 falls outside a predetermined voltage range), the second power supply monitoring unit 409 transmits a reset signal 413 to the power supply control unit 170 and the various devices 414. When the reset signal 413 is asserted (becomes active), the power supply control unit 170 is reset to its initial state.

As shown in the figure, the power supply control unit 170 supplies a reset signal 412 to the second power supply monitoring unit 409. When the power supply control unit 170 asserts the reset signal 412, the second power supply monitoring unit 409 asserts the reset signal 413. As a result, a reset is issued to the power supply control unit 170 and the various devices 414. It should be noted that in response to the input of the reset signal 413, the power supply control unit 170 determines whether or not the second power 406 is being normally supplied.

Figure 5A:
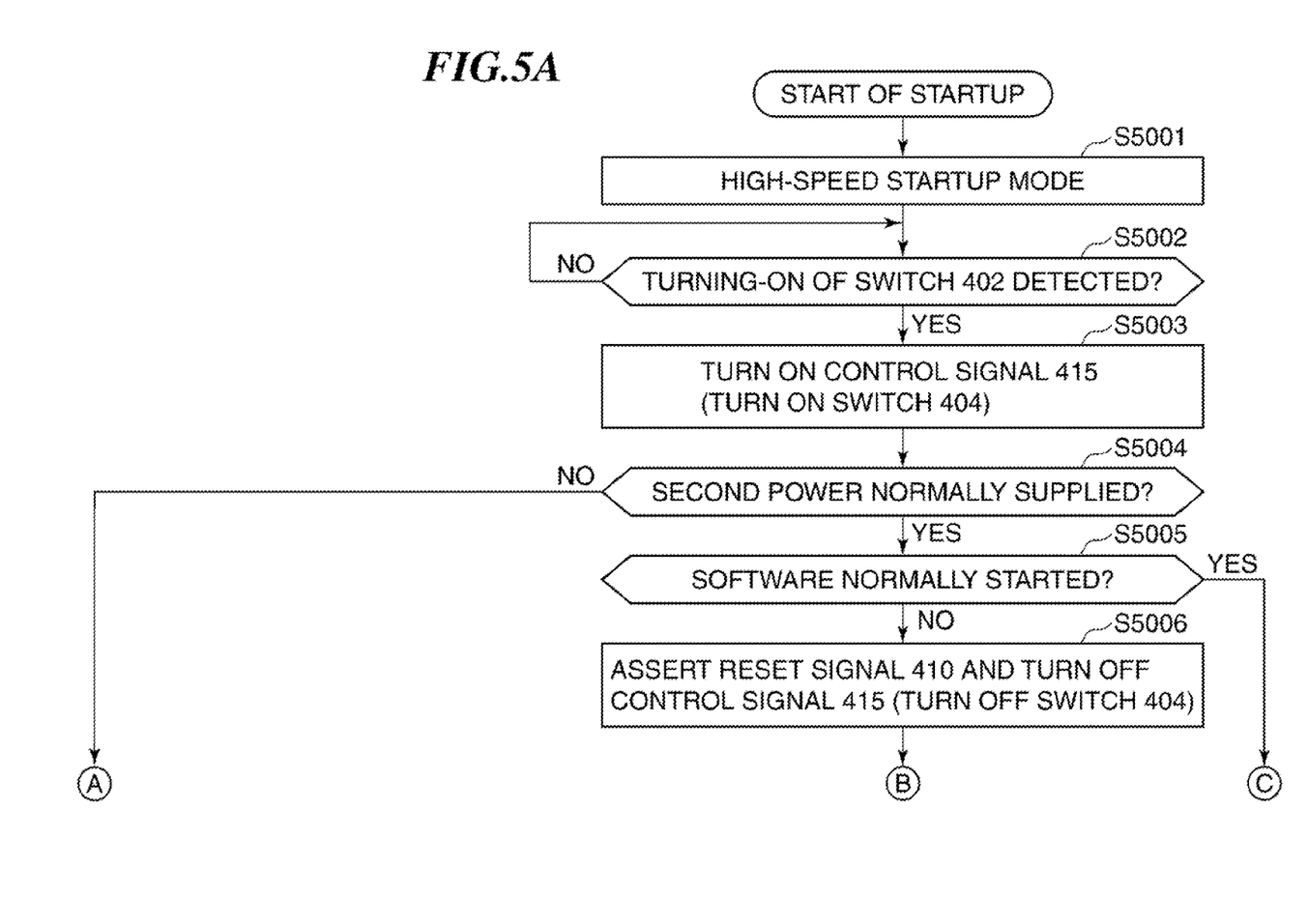
FIG. 5A is a flowchart useful in explaining an exemplary recovery process in a case where hang-up occurs when the image processing apparatus appearing in FIG. 1 is started in a high-speed startup mode.
Figure 5B:
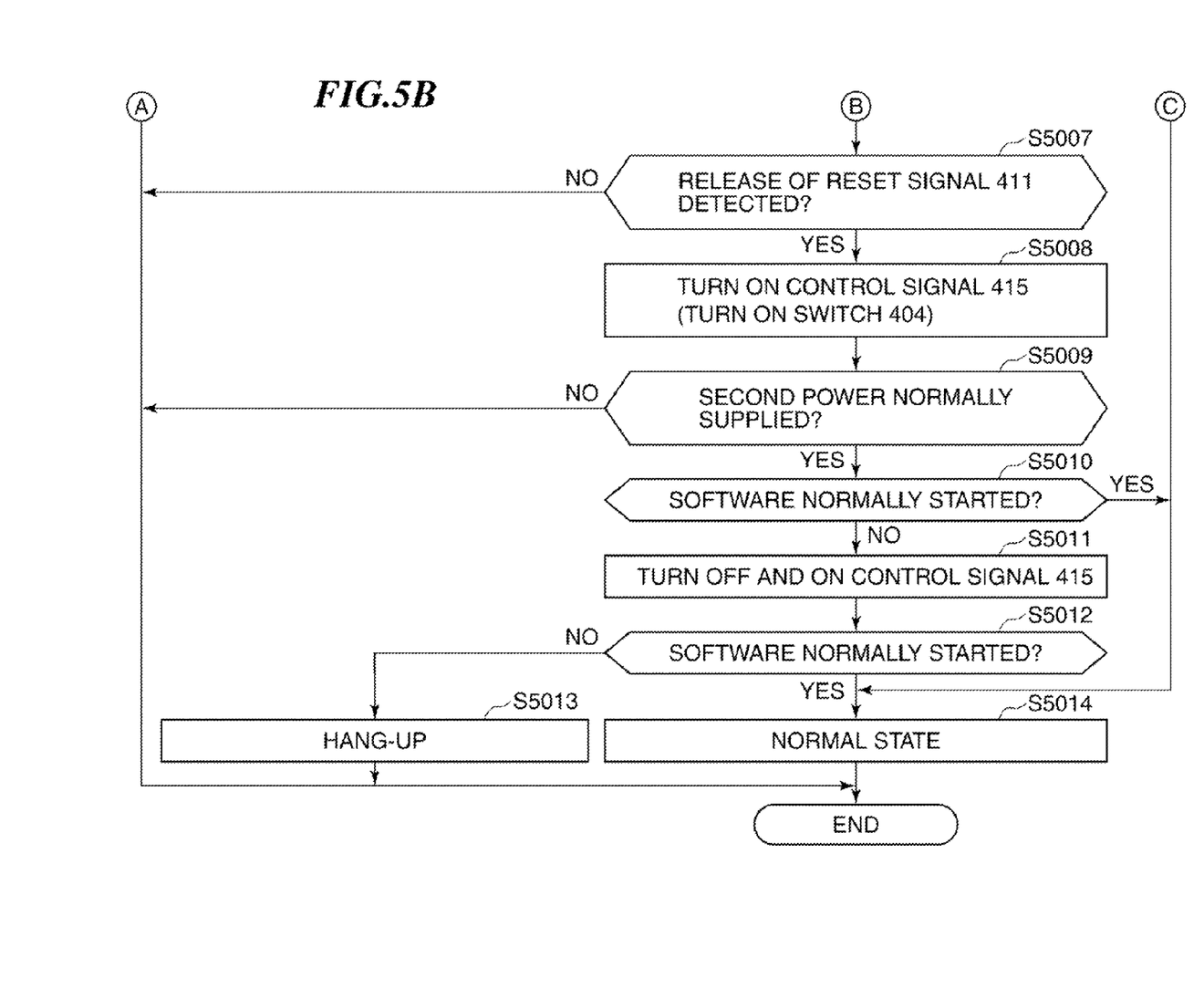
FIG. 5B is a flowchart useful in explaining an exemplary recovery process in a case where hang-up occurs when the image processing apparatus appearing in FIG. 1 is started in a high speed startup mode.

FIGS. 5A and 5B are flowcharts useful in explaining a recovery process in a case where hang-up occurs when the image processing apparatus appearing in FIG. 1 is started in the high-speed startup mode.

Referring to FIGS. 1, 3, 4, and 5A and 5B, assume now that the image forming apparatus 100 is set to the high-speed startup mode (step S5001). In the high-speed startup mode, the power supply control unit 170 turns on the control signal 407, turns off the control signal 415, turns on the second switch 403, and turns off the third switch 404. As a result, only the first power 405 is supplied to the controller unit 110. Then, electrical power for stopping the supply of the second power 406 and executing the high-speed startup mode is supplied to the image forming apparatus 100. It should be noted that in the high-speed startup mode, the first switch 402 is off.

The power supply control unit 170 monitors the first switch 402 to check whether or not the first switch 402 is turned on by the user (step S5002). When the first switch 402 is not turned on (NO in the step S5002), the power supply control unit 170 stands by.

When the first switch 402 is turned on (YES in the step S5002), the power supply control unit 170 turns on the control signal 415 and turns on the third switch 404 (step S5003). As a result, the second power 406 is supplied from the second power supply unit 401b to the controller unit 110.

Next, the power supply control unit 170 determines whether or not the second power 406 has been normally supplied to the controller unit 110 (step S5004). Here, the second power supply monitoring unit 409 releases the reset signal 413 when the voltage of the second power 406 is normal, and therefore, according to whether or not the reset signal 413 has been released, the power supply control unit 170 determines whether or not the second power 406 has been normally supplied.

When the second power 406 has not been normally supplied (NO in the step S5004), the power supply control unit 170 terminates the startup process.

When the second power 406 has been normally supplied (YES in the step S5004), the power supply control unit 170 determines whether or not software (program) has been normally started in the CPU 112 (step S5005). For example, the power supply control unit 170 is equipped with a watchdog timer. According to whether or not a watchdog interrupt to the watchdog timer has been released, the power supply control unit 170 determines whether or not software has been normally started.

When the software has been normally started (YES in the step S5005), the power supply control unit 170 brings the image processing apparatus 100 into its normal state (step S5014) and terminates the startup process.

When software has not been normally started (NO in the step S5005), the power supply control unit 170 asserts the reset signal 410 and turns off the control signal 415 (step S5006). Due to the reset signal 410 being asserted, the various devices 414 and the power supply control unit 170 are reset to their initial states as described earlier. Due to the control signal 415 being turned off, the third switch 404 is turned off, and the supply of the second power 406 to the controller unit 110 is stopped.

In the above described way, the devices to which the first power 405 is supplied are reset, and the supply of the second power 406 is stopped. Thus, even when software hangs up in the high-speed startup mode, the controller unit 110 returns to its initial state to do startup from the initial state.

Next, according to the reset signal 411, the power supply control unit 170 determines whether or not the first power supply monitoring unit 408 has canceled the reset (step S5007). Namely, according to whether or not the reset signal 411 has been released, the power supply control unit 170 determines whether or not the first power 405 is being normally supplied to the controller unit 110.

When the reset signal 411 has not been released (NO in the step S5007), the power supply control unit 170 terminates the startup process. On the other hand, when the reset signal 411 has been released (YES in the step S5007), the power supply control unit 170 turns on the control signal 415 and turns on the third switch 404 (step S5008). As a result, the second power 406 is supplied to the controller unit 110. It should be noted that the steps S5006 and S5008 correspond to a first on-off process (or off-on process).

Next, according to the reset signal 413, the power supply control unit 170 determines whether or not the second power supply monitoring unit 409 has canceled the reset (step S5009). Namely, according to whether or not the reset signal 413 has been released, the power supply control unit 170 determines whether or not the second power 406 is being normally supplied to the controller unit 110.

When the reset signal 413 has not been released (NO in the step S5009), the power supply control unit 170 terminates the startup process. On the other hand, when the reset signal 413 has been released (YES in the step S5009), the power supply control unit 170 determines again whether or not the software has been normally started (step S5010). When the software has been normally started (YES in the step S5010), the power supply control unit 170 brings the image processing apparatus 100 into its normal state (step S5014).

When the software has not been normally started (NO in the step S5010), the power supply control unit 170 turns off the control signal 415 and turns off the third switch 404 (step S5011). As a result, the supply of the second power 406 to the controller unit 110 is stopped. Thereafter, in the step S5011, the power supply control unit 170 turns on the control signal 415 and turns on the third switch 404. It should be noted that the step S5011 corresponds to a second off-on process.

Thus, when software hangs up, the second power 406 is turned off and then turned on to restart the software again. As a result, a chance of restoring the image processing apparatus 100 to its normal state is offered.

Moreover, in the step S5011, assertion of the reset signal 410 is not done. Because assertion of the reset signal 410 initializes the power supply control unit 170, assertion of the reset signal 410 in the step S5011 would cause the second power 406 to be repeatedly turned on and off when software repeatedly hangs up. Such repeated turning-on and off may cause damage to a normal device. For this reason, assertion of the reset signal 410 is not done in the step S5011.

Next, the power supply control unit 170 determines whether or not the software has been normally started (step S5012). When the software has been normally started (YES in the step S5012), the power supply control unit 170 brings the image processing apparatus 100 into its normal state and terminates the startup process. On the other hand, when the software has not been normally started (NO in the step S5012), the power supply control unit 170 determines that hang-up has occurred (step S5013) and terminates the startup process.

Thus, even when software hangs up in the high-speed startup mode, a chance of resetting the controller unit 110 to do startup from an initial state and restoring the image processing apparatus 100 to its normal state is offered. Then, when the software hangs up again during restart, the second power is turned off and then turned on so that the software can be started again. On this occasion, the power supply control unit 170 is not reset, and if hang-up of software occurs during the restart, restart is not repeated any more. As a result, damage to devices caused by turning-off and on of the second power can be reduced.

Figure 6A:
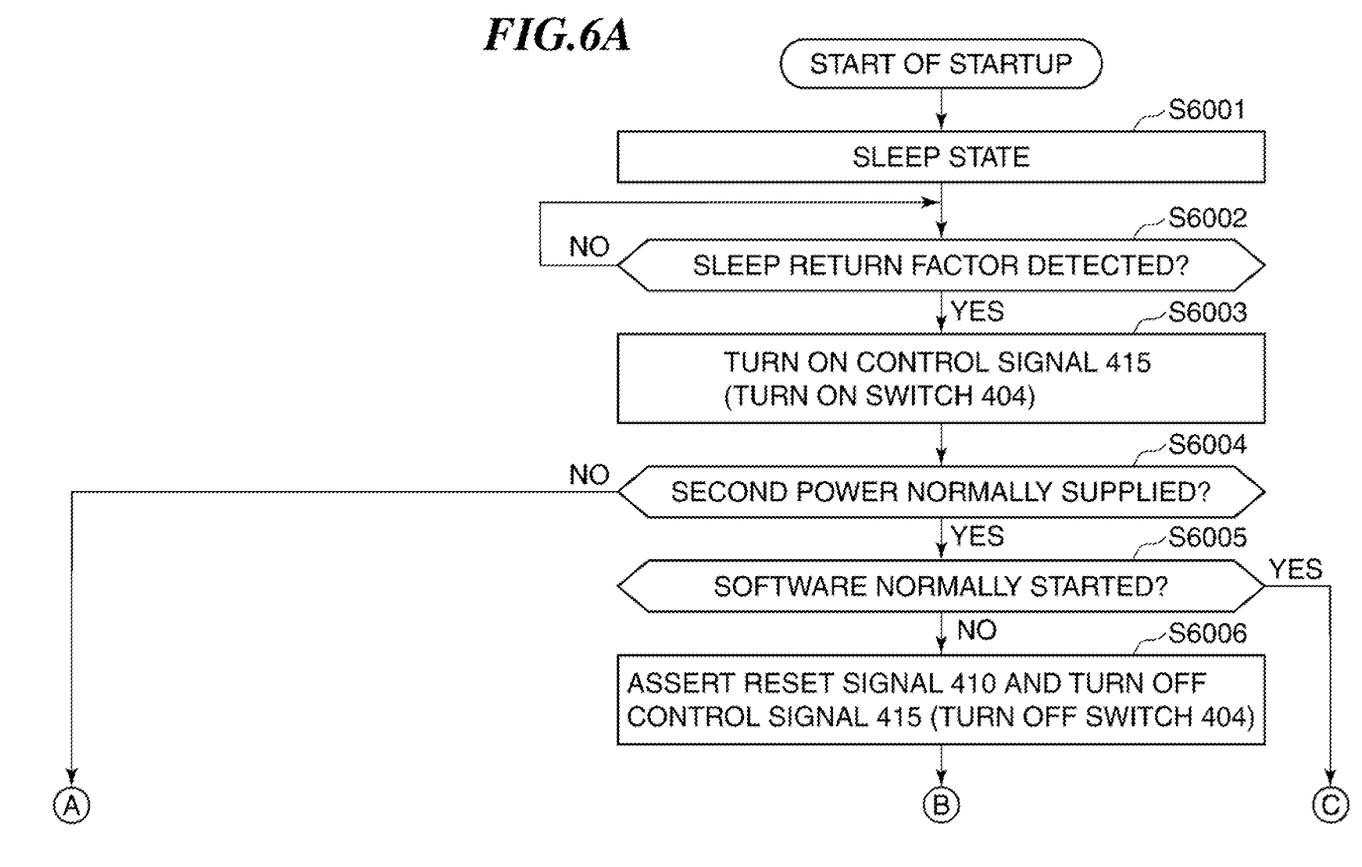
FIG. 6A is a flowchart useful in explaining a recovery process in a case where hang-up occurs when the image processing apparatus appearing in FIG. 1 returns from a sleep mode.
Figure 6B:
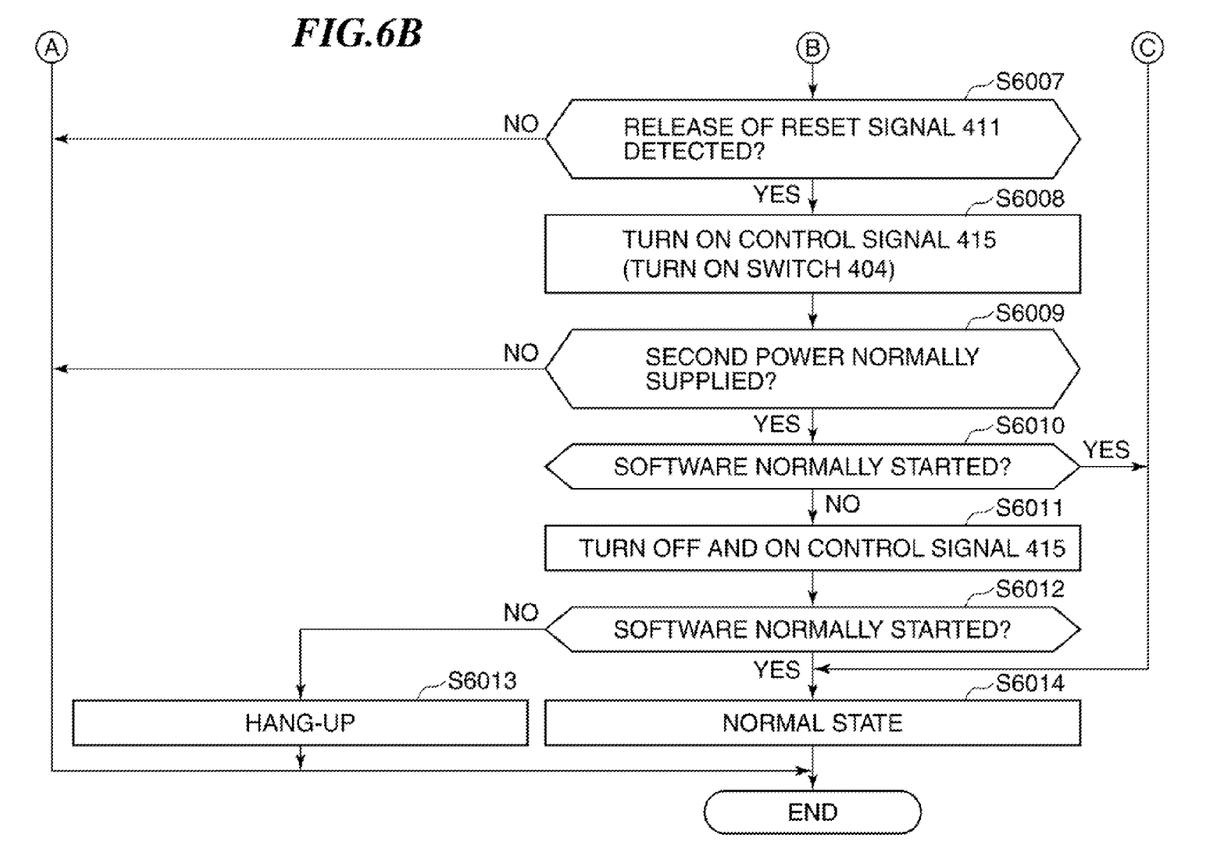
FIG. 6B is a flowchart useful in explaining a recovery process in a case where hang-up occurs when the image processing apparatus appearing in FIG. 1 returns from a sleep mode.

FIGS. 6A and 6B are flowcharts useful in explaining a recovery process in a case where hang-up occurs when the image processing apparatus appearing in FIG. 1 returns from the sleep mode.

Referring to FIGS. 1, 3, 4, 6A and 6B, assume now that the image processing apparatus 100 is in a sleep state which is a power-saving mode (step S6001). In the sleep state, the power supply control unit 170 turns on the control signal 407 and turns off the control signal 415. As a result, the second switch 403 is turned on, and the third switch 404 is turned off. Then, only the first power 405 is supplied to the controller unit 110, and minimum electrical power is supplied to the image processing apparatus 100.

The power supply control unit 170 monitors to determine whether or not there is any sleep return factor (step S6002). Here, the sleep return factor is, for example, receipt via FAX or LAN or operation on the console 150.

When there is no sleep recovery factor (NO in the step S6002), the power supply control unit 170 stands by. On the other hand, when there is any sleep recovery factor (YES in the step S6002), the power supply control unit 170 turns on the control signal 415 and turns on the third switch 404 (step S6003). As a result, the second power 406 is supplied to the controller unit 110.

Next, the power supply control unit 170 determines whether or not the second power 406 has been normally supplied to the controller unit 110 (step S6004). When the second power 406 has not been normally supplied to the controller unit 110 (NO in the step S6004), the power supply control unit 170 terminates the startup process.

When the second power 406 has been normally supplied to the controller unit 110 (YES in the step S6004), the power supply control unit 170 determines whether or not software has been normally started in the CPU 112 (step S6005). When the software has been normally started (YES in the step S6005), the power supply control unit 170 brings the image processing apparatus 100 into its normal state (step S6014) and terminates the startup process.

When the software has not been normally started (NO in the step S6005), the power supply control unit 170 asserts the reset signal 410 and turns off the control signal 415 (step S6006). As a result, the various devices 414 and the power supply control unit 170 are reset to their initial states, and the supply of the second power 406 to the controller unit 110 is stopped.

Next, according to the reset signal 411, the power supply control unit 170 determines whether or not the first power supply monitoring unit 408 has canceled the reset (step S6007). When the reset signal 411 has not been released (NO in the step S6007), the power supply control unit 170 terminates the startup process. On the other hand, when the reset signal 411 has been released (YES in the step S6007), the power supply control unit 170 turns on the control signal 415 and turns on the third switch 404 (step S6008). As a result, the second power 406 is supplied to the controller unit 110.

Next, according to the reset signal 413, the power supply control unit 170 determines whether or not the second power supply monitoring unit 409 has canceled the reset (step S6009). When the reset signal 413 has not been released (NO in the step S6009), the power supply control unit 170 terminates the startup process. On the other hand, when the reset signal 413 has been released (YES in the step S6009), the power supply control unit 170 determines again whether or not the software has been normally started (step S6010). When the software has been normally started (YES in the step S6010), the power supply control unit 170 brings the image processing apparatus 100 into its normal state (step S6014).

When the software has not been normally started (NO in the step S6010), the power supply control unit 170 turns off the control signal 415 and turns off the third switch 404 (step S6011). As a result, the supply of the second power 406 to the controller unit 110 is stopped. Thereafter, in the step S6011, the power supply control unit 170 turns on the control signal 415 and turns on the third switch 404.

Next, the power supply control unit 170 determines whether or not the software has been normally started (step S6012). When the software has been normally started (YES in the step S6012), the power supply control unit 170 brings the image processing apparatus 100 into its normal state and terminates the startup process. On the other hand, when the software has not been normally started (NO in the step S6012), the power supply control unit 170 determines that software hangs up (step S5013) and terminates the startup process.

In this way, even when software hangs up at the time of return from the sleep mode, a chance of resetting the controller unit 110 to do startup again from an initial state and restoring the image processing apparatus 100 to its normal state is offered. Then, when the software hangs up again during the restart, the second power is turned off and then turned on so that the software can be started again. On this occasion, the power supply control unit 170 is not reset, and when the software hangs up during the restart, restart is not repeated any more. As a result, damage to devices caused by turning-on and off of the second power can be reduced.

Thus, in the embodiment of the present embodiment, even when hang-up occurs, the chance of eliminating a hang-up state and restoring to a normal state without bothering the user can be increased.

As is clear from the above description, referring to FIG. 4, the first switch 402, the second switch 403, and the first power supply unit 401a constitute a first power supply unit. Also, the third switch 404 and the second power supply unit 401b constitute a second power supply unit. Further, the power supply control unit 170, the first power supply monitoring unit 408, and the second power supply monitoring unit 409 act as a determination unit and a control unit.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 Image processing apparatus
110 Control device (controller unit)
150 Console
170 Power supply control unit
200 Image input device (reader unit)
300 Image output device (printer unit)
401a, 401b Power supply unit
402, 403, 404 Switch
408, 409 Power supply monitoring unit
414 Various devices

The invention claimed is:
1. An information processing apparatus, comprising:
a control unit;
a storage unit configured to store software carried out by said control unit;
a first power supply unit configured to supply power to said storage unit;
a second power supply unit configured to supply power to said control unit; and a power control unit configured to, in a case where a return instruction is detected in a power saving state in which power is supplied from said first power supply unit to said storage unit and power is not supplied from said second power supply unit to said control unit, perform control so that power is supplied from said second power supply unit to said control unit, wherein in a case where software carried out by said control unit to which power has been supplied is not normally carried out, said power control unit carries out a first OFF/ON process in which said power control unit performs control so that said storage unit is reset, stops power supply from said second power supply unit to said control unit, and then restarts power supply from said second power supply unit to said control unit, and wherein in a case where the software carried out by said control unit to which power has been supplied through the first OFF/ON process is not normally carried out, said power control unit carries out a second OFF/ON process in which said power control unit stops power supply from said second power supply unit to said control unit and then restarts power supply from said second power supply unit to said control unit without resetting said storage unit.

2. The information processing apparatus according to claim 1, wherein in a case where the software carried out by said control unit to which power has been supplied through the second OFF/ON process is not normally carried out, the software is determined to hang-up, and startup of the software is terminated.

3. The information processing apparatus according to claim 1, wherein said power control unit has a timer, and wherein in a case where the timer is not interrupted by the software within a time period during which the timer continues counting, the software is determined not to be normally carried out.

4. The information processing apparatus according to claim 1, further comprising an image output unit configured to form an image on a sheet.

5. The information processing apparatus according to claim 1, further comprising a network interface configured to receive data from an external apparatus, wherein in the power saving state, power is supplied to said storage unit whereas power is not supplied to said network interface.

6. The information processing apparatus according to claim 5, wherein said network interface is an interface that receives data from a local area network or an interface that detects receipt from a facsimile transmission.

7. The information processing apparatus according to claim 1, wherein the return instruction is issued in response to a power switch being depressed by a user.

8. An information processing apparatus that operates in a first electrical power state or a second electrical power state in which the smaller electric power is consumed than in the first electrical power state, comprising:

a power control unit configured to, when a condition for bringing an electrical power state of the information processing apparatus from the second electrical power state into the first electrical power state is detected, carry out a transition process of bringing the electrical power state of the information processing apparatus into the first electrical power state;

a detecting unit configured to detect whether software which is started when said power control unit brings the electrical power state of the information processing apparatus into the first electrical power state is normally started; and a initializing unit configured to initialize said power control unit when said detecting unit detects that the software is not normally started, wherein said power control unit initialized by said initializing unit carries out again the transition process of bringing the electrical power state of the information processing apparatus into the first electrical power state.

9. A control method for an information processing apparatus having a control unit, a storage unit that stores software carried out by the control unit, a first power supply unit that supplies power to the storage unit, a second power supply unit that supplies power to the control unit, and a power control unit that performs, in a case where a return instruction is detected in a power saving state in which power is supplied from the first power supply unit to the storage unit and power is not supplied from the second power supply unit to the control unit, control so that power is supplied from the second power supply unit to the control unit, the control method comprising:

a first control step of, in a case where software carried out by the control unit to which power has been supplied is not normally carried out, carrying out a first OFF/ON process in which the storage unit is reset, power supply from the second power supply unit to the control unit is stopped, and then power supply from the second power supply unit to the control unit is restarted, and a second control step of, in a case where the software carried out by the control unit to which power has been supplied through the first OFF/ON process is not normally carried out, carrying out a second OFF/ON process in which power supply from the second power supply unit to the control unit is stopped and then power supply from the second power supply unit to the control unit is restarted without resetting the storage unit.

10. The control method according to claim 9, wherein in a case where the software carried out by the control unit to which power has been supplied through the second OFF/ON process is not normally carried out, the software is determined to be hung-up, and startup of the software is terminated.

11. The control method according to claim 9, further comprising an image output step of forming an image on a sheet.

12. A non-transitory computer-readable storage medium storing a program for executing a control method for an information processing apparatus having a control unit, a storage unit that stores software carried out by the control unit, a first power supply unit that supplies power to the storage unit, a second power supply unit that supplies power to the control unit, and a power control unit that performs, in a case where a return instruction is detected in a power saving state in which power is supplied from the first power supply unit to the storage unit and power is not supplied from the second power supply unit to the control unit, control so that power is supplied from the second power supply unit to the control unit, the control method comprising:

a first control step of, in a case where software carried out by the control unit to which power has been supplied is not normally carried out, carrying out a first OFF/ON process in which the storage unit is reset, power supply from the second power supply unit to the control unit is stopped, and then power supply from the second power supply unit to the control unit is restarted, and a second control step of, in a case where the software carried out by the control unit to which power has been supplied through the first OFF/ON process is not normally carried out, carrying out a second OFF/ON process in which power supply from the second power supply unit to the control unit is stopped and then power supply from the second power supply unit to the control unit is restarted without resetting the storage unit.

\* \* \* \* \*